Nov. 20, 1956 R. W. STOLZENBACH 2,771,581
WAVE ANALYZER
Filed Oct. 14, 1955
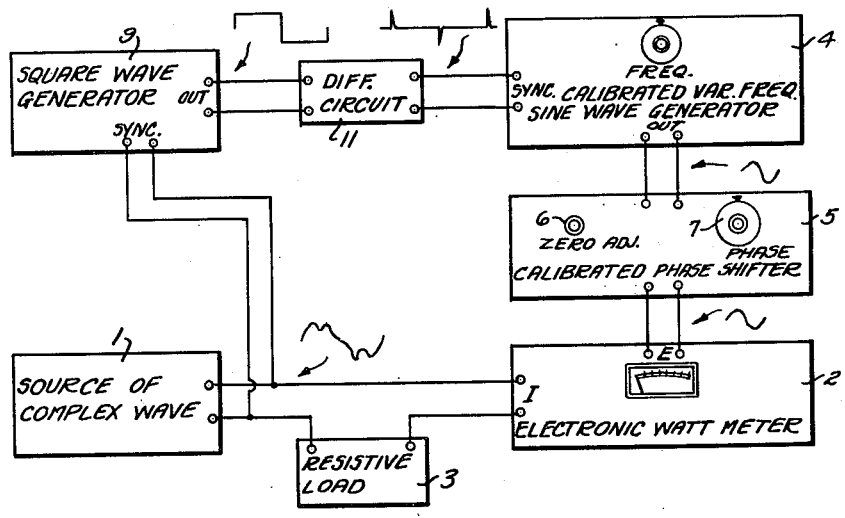
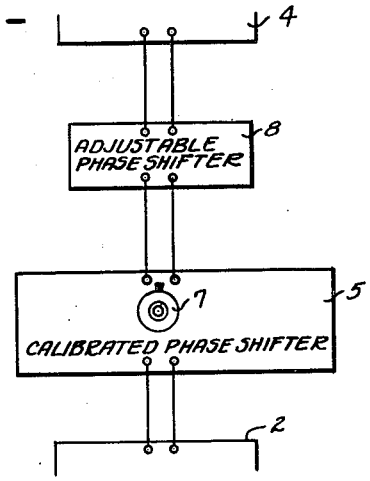
INVENTOR.
ROBERT W. STOLZENBACH

United States Patent Office 2,771,581
Patented Nov. 20, 1956

2,771,581

WAVE ANALYZER

Robert W. Stolzenbach, Dayton, Ohio, assignor to the United States of America as represented by the Secretary of the Air Force Application October 14, 1955, Serial No. 540,658

4 Claims. (Cl. 324—77)

(Granted under Title 35, U. S. Code (1952), sec. 266)

The invention described herein may be manufactured and used by or for the United States Government for governmental purposes without payment to me of any royalty thereon.

The invention relates to apparatus for determining the harmonic content of a complex periodic wave.

The principal objects of the invention are to provide a wave analyzer that will indicate harmonic amplitude and phase relative to the fundamental, that will operate over a wide frequency range with high selectivity and that is relatively inexpensive to manufacture. Briefly the analyzer comprises a wide frequency range alternating current wattmeter, a calibrated variable frequency sine wave generator and a calibrated phase shifter. The complex wave to be analyzed is fed to the current circuit of the wattmeter while the output of the sine wave generator is fed through the phase shifter to the voltage circuit of the wattmeter. In order to prevent frequency and phase drift of the sine wave generator relative to the components of the complex wave, a synchronizing circuit is provided which derives a synchronizing voltage from the complex wave and applies it to the sine wave generator for stabilizing the generator relative to the wave being analyzed. In performing an analysis of a complex wave with the apparatus the reading of the wattmeter is maximized by coordinated adjustment of the sine wave generator and the phase shifter. The frequency of the particular component is then indicated by the calibrated sine wave generator and its amplitude relative to the fundamental of the wave is indicated by the wattmeter reading. Also, the reading of the calibrated phase shifter, if previously zeroed at the fundamental, is indicative of the phase relation of the particular component relative to the fundamental.

A more detailed description of the invention will be given in connection with the specific embodiment thereof shown in the accompanying drawing, in which—

Fig. 1 is a block diagram of the wave analyzer; and
Fig. 2 shows a modification of Fig. 1.

Referring to Fig. 1, 1 represents any source of a complex wave to be analyzed. This wave is caused to flow through the I or current circuit of wattmeter 2 to a load 3 having no reactance. The E or voltage circuit of the wattmeter receives a sine wave of variable frequency and phase from calibrated sine wave generator 4 feeding through calibrated phase shifter 5. The sine wave generator must have a constant amplitude over its frequency range. Also, in the phase shifter 5, the ratio of output amplitude to input amplitude must be constant over the required frequency range and the phase shift introduced must be independent of frequency. Signal generators and phase shifters meeting these requirements are well known and readily available. For example, one type of phase shifter in which the phase shift is independent of frequency has an output coil which may be angularly positioned with respect to a rotating magnetic field produced by the applied sine wave. The position of the coil in this field determines the phase shift introduced.

In this application, it is convenient for the phase shifter to have a zero adjustment 6 through which it is possible to set the phase shift to a desired value when the calibrated dial 7 is in its zero position. This may be accomplished either mechanically or electrically, or, if necessary, an additional phase shifter 8 may be employed as shown in Fig. 2. The principal purpose of this adjustment as will be seen later is to compensate for the phase shift introduced by the synchronizing circuit.

In order to synchronize the sine wave generator 4 with the complex wave, this wave is first used to synchronize square wave generator 9. The resulting synchronized square wave is then differentiated by circuit 11 to produce a series of sharp pulses which are applied to the synchronizing circuit of generator 4. The sine wave output of generator 4 will then be synchronized with the complex wave but there will be a certain time difference between the start of the sine wave cycle and the start of the complex wave cycle depending upon the point in the complex wave at which the square wave generator 9 synchronizes. The purpose of zero adjustment 6 in phase shifter 5, or phase shifter 8 in Fig. 2, is to compensate for this time difference.

The indication of the wattmeter, as is known, is proportional to $EI \cos \theta$, where E and I represent the amplitudes of voltage and current waves of the same frequency and $\theta$ is the phase angle between the two waves. Thus the wattmeter reading varies from a maximum to zero as the phase angle changes from 0° to 90°. The complex current wave flowing through the I circuit of wattmeter 2 is composed of a number of sinusoidal components consisting of a fundamental component having the same frequency as the complex wave and one or more higher harmonics having frequencies that are integral multiples of the fundamental frequency. Whenever a sinusoidal voltage having the same frequency as one of these components is applied to the E terminals of the wattmeter the meter gives an indication proportional to the amplitudes of the component and the applied voltage and the cosine of the phase angle between them. If the phase of the applied voltage is now varied until a maximum reading of the wattmeter is obtained, which occurs when the phase angle has been reduced to zero, this reading will be proportional to the amplitude of the particular component in the complex wave, assuming a fixed value for the E voltage. The procedure for using the wave analyzer therefore is as follows:

Sine wave generator 4 is first adjusted to the lowest frequency for which a reading on the wattmeter can be obtained through variation of the zero adjustment 6 of phase shifter 5, or by variation of phase shifter 8 (Fig. 2). With dial 7 of the phase shifter set at zero, adjustment 6 (or phase shifter 8) is adjusted simultaneously with the frequency of sine wave generator 4 until the wattmeter indication is maximized. This reading is proportional to the amplitude of the fundamental in the complex wave. The frequency of the fundamental is indicated by the dial of the calibrated sine wave generator 4. The frequency and amplitude of each of the higher harmonics is determined in the same manner except, in this case, the phase of the exploring sine wave at the E terminals is adjusted by dial 7 of the phase shifter 5 rather than by dial 6 or phase shifter 8 (Fig. 2) as in the case of the fundamental. The setting of dial 7 for which a maximum reading is obtained at any of the higher harmonic frequencies indicates the number of degrees of the particular harmonic cycle that separate the start of the harmonic cycle and the start of the fundamental cycle. Therefore the reading of dial 7 indicates the phase of the particular harmonic relative to the fundamental.

Without the synchronizing circuit it would be very difficult to obtain a maximum reading on the wattmeter since the normal drift of the sine wave generator would cause a continuously varying phase relation between the two waves applied to the meter and therefore a continuously varying reading. The synchronizing circuit stabilizes the frequency of the exploring sine wave with respect to the component of the complex wave having the same frequency so that no phase variations occur other than the desired phase shift introduced by phase shifter 5.

The frequency range of the wave analyzer is limited only by the frequency range of the wattmeter. Electronic wattmeters are commercially available having a frequency range extending from 20 c./s. to 200 kc./s.

The frequency selectivity of the analyzer is inherently high due to the fact that the slightest frequency difference between the waves at the E and I terminals will cause a gradual change in relative phase resulting in a fluctuation in the wattmeter reading between a maximum and zero as the phase difference varies between the in-phase and phase quadrature conditions. Therefore, when a steady maximum reading is obtained on the wattmeter the frequency at the E terminals must be identical to that at the I terminals.

I claim:

1. A wave analyzer comprising an alternating current wattmeter having two pairs of input terminals; a non-reactive load; means for applying a complex wave to be analyzed across one of said pairs of input terminals and said load connected in series; a calibrated, adjustable frequency, constant output sine wave generator; a calibrated, adjustable, frequency independent phase shifter; means coupling the output of said generator through said phase shifter to the other of said pairs of terminals; and means responsive to said complex wave and connected to said generator for synchronizing said generator with said complex wave.

2. Apparatus as claimed in claim 1 in which said synchronizing means comprises a square wave generator, means for applying said complex wave to said square wave generator for synchronizing said square wave generator at the frequency of said complex wave, means coupled to said square wave generator for differentiating the square wave produced thereby, and means for applying the output of said differentiating means to said sine wave generator for synchronizing said sine wave generator.

3. Apparatus as claimed in claim 1 in which said phase shifter contains a calibrated phase shift indicator and zero adjusting means for presetting the phase shift to a desired value when said indicator is in its zero position.

4. Apparatus as claimed in claim 1 in which an additional, adjustable, frequency independent phase shifter is situated in cascade with said calibrated phase shifter.

References Cited in the file of this patent
UNITED STATES PATENTS

| | | |
|---|---|---|
| 2,428,021 | Greig | Sept. 30, 1947 |
| 2,561,478 | Mitchell | July 24, 1951 |